(12) United States Patent
Chanda et al.

(10) Patent No.: US 11,799,927 B1
(45) Date of Patent: Oct. 24, 2023

(54) SYSTEMS AND METHODS FOR DISTRIBUTED VECTOR DRAWING PIPELINE FOR COLLABORATION SYSTEMS

(71) Applicant: Haworth, Inc., Holland, MI (US)

(72) Inventors: Rupen Chanda, Austin, TX (US); Diyu Liu, Fremont, CA (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 18/213,181

(22) Filed: Jun. 22, 2023

Related U.S. Application Data

(60) Provisional application No. 63/355,260, filed on Jun. 24, 2022.

(51) Int. Cl.
*H04L 65/403* (2022.01)
*G06T 11/00* (2006.01)

(52) U.S. Cl.
CPC .......... *H04L 65/403* (2013.01); *G06T 11/001* (2013.01); *G06T 2200/24* (2013.01)

(58) Field of Classification Search
CPC .. H04L 65/403; G06T 11/001; G06T 2200/24
USPC ....................................................... 709/204
See application file for complete search history.

(56) References Cited

U.S. PATENT DOCUMENTS

| | | | | |
|---|---|---|---|---|
| 2009/0119580 A1* | 5/2009 | Rohrabaugh | ......... | G06F 40/134 715/205 |
| 2009/0187817 A1* | 7/2009 | Ivashin | ............. | H04N 1/00244 715/230 |
| 2013/0031467 A1* | 1/2013 | Zylik | ................. | G06F 16/9577 715/234 |
| 2014/0347485 A1* | 11/2014 | Zhang | ...................... | B60R 1/00 348/148 |
| 2019/0065135 A1* | 2/2019 | Yamat | ................... | G06F 40/106 |

* cited by examiner

*Primary Examiner* — Zi Ye
(74) *Attorney, Agent, or Firm* — Haynes Beffel & Wolfeld LLP; Andrew L. Dunlap

(57) ABSTRACT

Systems and methods are provided for processing data received at a server node from a first client node. The method includes generating filtered data by removing one or more erroneous sample points from the data received from the first client node. The one or more erroneous sample points represent one or more sample points determined to be unintentionally entered at the first client node. The method includes generating selected data by removing one or more redundant sample points from the filtered data. The method includes generating graphical data at multiple fidelity levels from the selected data. The method includes receiving a current zoom level of the second client node displaying a portion of a shared virtual workspace that includes a digital asset associated with the graphical data. The method includes sending the generated graphical data to the second client node in dependence on the current zoom level.

30 Claims, 7 Drawing Sheets

SYSTEMS AND METHODS FOR DISTRIBUTED VECTOR DRAWING PIPELINE FOR COLLABORATION SYSTEMS

PRIORITY APPLICATION

This application claims the benefit of U.S. Provisional Patent Application No. 63/355,260, entitled, "Systems and Methods for Distributed Vector Drawing Pipeline for Collaboration Systems," filed on 24 Jun. 2022, which application is incorporated herein by reference.

FIELD OF INVENTION

The present technology relates to collaboration systems that enable users to actively collaborate in a virtual workspace in a collaboration session. More specifically, the technology relates to efficiently sending data from one client device, via the server node, to another client device, in a collaboration session.

BACKGROUND

Collaboration systems are used in a variety of environments to allow users to participate in content generation and content review. Users of a collaboration system can join collaboration sessions from locations around the world.

During a collaboration session, the participants of a collaboration session can draw on a digital whiteboard. Participants can draw or annotate to present ideas and/or provide comments on digital assets displayed on a workspace (also referred to as a virtual workspace, a digital whiteboard, or an online whiteboard). Various participants of the collaboration session can use different types of digital displays with a variety of display sizes, image resolutions, etc. Some participants may be viewing the workspace using a zoomed-in view of a portion of the workspace while others may be viewing digital assets on the workspace in a zoomed-out view. The graphical drawing and annotation data is sent from a client node (or computing device) of a first user (who draws on the digital whiteboard) to the client node of a second user for rendering and/or displaying the graphical drawing or annotation on the digital display linked to or associated with the client node of the second user. The graphical drawings or annotations data is routed via a server node. The server node receives the drawing or annotations data from the computing device of the first user and sends it to one or more other computing devices of users participating in the collaboration session. As the graphical drawings or annotations become complex, more data needs to be transferred between client devices. This can result in delays in transfer of data and a reduction in quality of collaboration sessions.

An opportunity arises to provide a technique for efficiently transferring graphical drawings, shapes and/or annotations data from one client node to another client node in a collaboration session.

SUMMARY

A system and method of processing data received at a server node are presented. The method includes receiving data at the server node from a first client node participating in a collaboration session using a shared virtual workspace. The method includes generating filtered data by removing one or more erroneous sample points from the data received from the first client node participating in the collaboration session. The one or more erroneous sample points can represent one or more sample points determined to be unintentionally entered at the first client node during the collaboration session. The method includes generating selected data by removing one or more redundant sample points from the filtered data. A redundant sample point represents a sample point of the filtered data that can be regenerated from one or more adjacent sample points of the filtered data, using interpolation. The method includes generating, from the selected data, graphical data at multiple fidelity levels including at least one of low-fidelity graphical data, medium-fidelity graphical data and high-fidelity graphical data. The method includes receiving, from a second client node, a current zoom level of the second client node displaying a portion of the shared virtual workspace that includes a digital asset associated with the graphical data. The method includes sending at least one of the low-fidelity graphical data, the medium-fidelity graphical data and the high-fidelity graphical data to the second client node in dependence on the current zoom level of the second client node.

The graphical data includes at least two of the low-fidelity graphical data, the medium-fidelity graphical data and the high-fidelity graphical data. It is understood that graphical data can be generated at more than three fidelity levels such as five fidelity levels including very low-fidelity graphical data, low fidelity graphical data, medium-fidelity graphical data, high-fidelity graphical data and very high-fidelity graphical data.

The method can further include sending the low fidelity graphical data to the second client node when the current zoom level of the second client node is within a low-resolution range wherein the low-resolution range is less than a first resolution threshold.

The method can further include sending the medium fidelity graphical data to the second client node when the current zoom level of the second client node is with a medium-resolution range wherein the medium-resolution range is greater than a first resolution threshold and less than a second resolution threshold.

The method can further include sending the high-fidelity graphical data to the second client node when the current zoom level of the second client node is with a high-resolution range wherein the high-resolution range is greater than a second resolution threshold.

The data received by the server node from the first client node is referred to as an "intermediate representation" of the sample points corresponding to the sample points entered at the first client node. The size of the data corresponding to the intermediate representation of sample points is less than the size of the data corresponding to the sample points entered at the first client node.

The data received by the server node includes stroke data corresponding to a shape or a drawing generated from an input at the first client node. The stroke data can include a width of at least a portion of the shape or drawing. The stroke data can include a color of at least a portion of the shape or drawing. The stroke data can include a location of sample points corresponding to at least a portion of the shape or drawing. The stroke data can include other information such as the gesture or action data indicating an operation performed by a user. For example, a user may have drawn a circle around three digital assets to group the digital assets. The stoke data can include the information that the three digital assets enclosed within the stoke data are related to each other or grouped together. A user may also draw a line across multiple digital assets to create a relationship amongst the digital assets. The stroke data can include this relationship data indicating the digital assets that are related to each other. The stroke data can include information about the source client node.

The data can further include an interpolation type of a path represented by at least a portion of sample points included in the data. The interpolation type can indicate a method to construct new data points within a range of sample points in the data to allow for displaying or rendering the graphical data.

The sending of the generated graphical data to the second client node allows the second client node to perform the following operations. The method includes allowing the second client node to generate at least one of polygons and triangulation data by processing the sample points in the graphical data. The method includes allowing the second client node to process the at least one of the polygons and the triangulation data to generate a path. The method includes allowing the second client node to render the graphical data using the path and values of other parameters included in the graphical data wherein the other parameters include at least two of a width parameter, a color parameter, and a location parameter. The method includes allowing the second client node to display the rendered graphical data on a graphical display associated with the second client node.

A system including one or more processors coupled to memory is provided. The memory is loaded with computer instructions to process data received at a server node from a first client node participating in a collaboration session using a shared virtual workspace. The server node can include one or more processors. A client node can include a display and one or more processors. The instructions, when executed on the one or more processors, implement operations presented in the method above.

Computer program products which can execute the methods presented above are also described herein (e.g., a non-transitory computer-readable recording medium having a program recorded thereon, wherein, when the program is executed by one or more processors the one or more processors can perform the methods and operations described above).

A system and method of processing data are disclosed. The method includes a first client node receiving graphical data from a server node participating in a collaboration session using a shared virtual workspace. The method includes, the first client node, providing to the server node, a current zoom level of the first client node displaying a portion of the shared virtual workspace that includes a digital asset associated with the graphical data. The method includes the first client node, receiving, from the server node, graphical data generated by the server node. The graphical data is generated by the server node by generating filtered data by removing the one or more erroneous sample points from data received from a second client node participating in the collaboration session. The one or more erroneous sample points can represent one or more sample points determined to be unintentionally entered at the first client node during the collaboration session. The method includes, the server node, generating selected data by removing one or more redundant sample points from the filtered data. The redundant sample point can represent sample point, of the filtered data, that can be regenerated from one or more adjacent sample points of the filtered data, using interpolation. The method includes, the server node, generating, from the selected data, the graphical data at multiple fidelity levels including at least one of low-fidelity graphical data, medium-fidelity graphical data and high-fidelity graphical data. The received graphical data can include at least one of the low-fidelity graphical data, the medium-fidelity graphical data and the high-fidelity graphical data selected in dependence on the current zoom level of the first client node.

The data received at the server node from the second client node can be an intermediate representation of the sample points corresponding to the sample points entered at the second client node wherein a size of the data corresponding to the intermediate representation of sample points is less than a size of the data corresponding to the sample points entered at the second client node.

The data received at the server node from the second client node can include stroke data corresponding to a shape or drawing generated from an input at the first client node.

The stroke data can include a width of at least a portion of the shape or drawing. The stroke data can include a color of at least a portion of the shape or drawing. The stroke data can include a location of sample points corresponding to at least a portion of the shape or drawing.

A system including one or more processors coupled to memory is provided. The memory is loaded with computer instructions to process data received at a first client node from a server node participating in a collaboration session using a shared virtual workspace. The server node can include one or more processors. A client node can include a display and one or more processors. The instructions, when executed on the one or more processors, implement operations presented in the method above.

Computer program products which can execute the methods presented above are also described herein (e.g., a non-transitory computer-readable recording medium having a program recorded thereon, wherein, when the program is executed by one or more processors the one or more processors can perform the methods and operations described above).

Other aspects and advantages of the present technology can be seen on review of the drawings, the detailed description, and the claims, which follow.

BRIEF DESCRIPTION OF THE DRAWINGS

The technology will be described with respect to specific embodiments thereof, and reference will be made to the drawings, which are not drawn to scale, described below.

DETAILED DESCRIPTION

Figure 1:
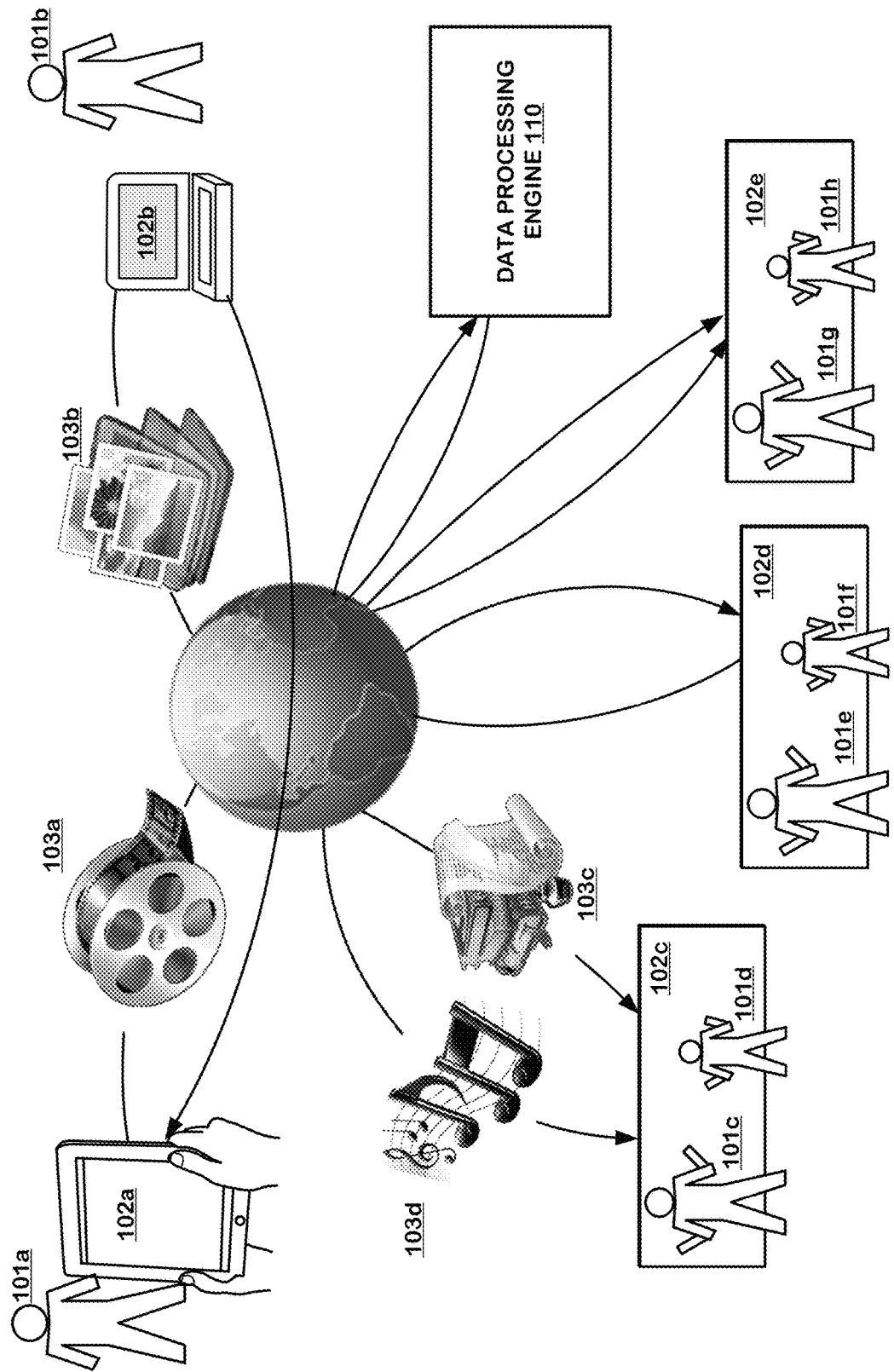
FIGS. 1 and 2 illustrate example aspects of a system implementing distributed vector drawing pipeline for collaboration amongst participants of a collaboration session.

A detailed description of embodiments of the present technology is provided with reference to FIGS. 1-7.

The following description is presented to enable a person skilled in the art to make and use the technology and is provided in the context of a particular application and its requirements. Various modifications to the disclosed embodiments will be readily apparent to those skilled in the art, and the general principles defined herein may be applied to other embodiments and applications without departing from the spirit and scope of the present technology. Thus, the present technology is not intended to be limited to the embodiments shown, but is to be accorded the widest scope consistent with the principles and features disclosed herein.

INTRODUCTION

Collaboration systems are used in a variety of environments to allow users to contribute and participate in content generation and review. Users of collaboration systems can join collaboration sessions from remote locations around the world. A participant in a collaboration session can share digital assets or content with other participants in the collaboration session, using a digital whiteboard (also referred as a virtual workspace, a workspace, an online whiteboard, etc.). The digital assets can be documents such as word processor files, spreadsheets, slide decks, notes, program code, etc. Digital assets can also be native or non-native graphical objects such as images, videos, line drawings, annotations, etc. The digital assets can also include websites, webpages, web applications, cloud-based or other types of software applications that execute in a window or in a browser displayed on the workspace.

The technology disclosed is related to efficient transfer of digital assets such as drawings, annotations etc. in a collaboration session including a plurality of client nodes (or client nodes) and a collaboration server (also referred to as a server node). The technology disclosed converts the digital assets such as drawings, annotations, etc. to a so-called "intermediate representation" (or IR) at a first (or a source) client node (or client node or client node). Instead of sending the digital assets in a raw format from the first client node over the network to the collaboration server, the technology disclosed converts the digital assets to the intermediate representation and sends the intermediate representation of digital assets which reduces the amount of data transmitted over the network. Therefore, latency in data transmission for participants of the collaboration session is reduced. The intermediate representation of digital assets is lightweight thus less processing is required to render the digital assets at a second destination client node. The data received by the server node (or the collaboration server) corresponds to graphical shapes (such as graphical drawings, annotations, etc.) generated from a user input at a client node (or a client node or a client device). This data is referred to as intermediate representation or stroke data.

The technology disclosed includes logic to process the raw data entered via mouse, pen, touch or other types of inputs at the first client node to extract sample points that define a path of the raw input data. The client node generates the intermediate representation (also referred to as stroke data) of the raw input data that includes the sample points and parameters such as color, width, position, etc. of the raw input data. The intermediate representation can also include other types of information that can be used to efficiently render the stroke data at the remote client node. For example, the intermediate representation can include an "interpolation type" such as Bezier, Spline, etc. that can be used to generate the polygons at the second client node.

The intermediate representation of the digital assets is then sent to the collaboration server (or server node or server node). The collaboration server processes the intermediate representation (or other representation) of the digital assets before sending out the intermediate representation of digital assets to the second client node for rendering the digital assets on graphical display at the second client node. The collaboration server can process the intermediate representation of digital assets to filter and optimize the intermediate representation of digital assets. For example, the collaboration server includes logic to remove erroneous sample points or redundant sample points from sample points. Such points may not be necessary for rendering digital assets on the remote client nodes. In other words, redundant sample points can be points that do not necessarily need to be provided to the client node because the client node can use interpolation based on other data points to "fill in" information of the redundant data points that were removed. For example, the redundant data points are points that can be removed by the server and can be regenerated by applying an interpolation technique on adjacent data points (e.g., data points that are/were adjacent to the redundant data points that were removed). The erroneous sample points can represent sample or data points that were created unintentionally by the user. For example, if a user were attempting to draw a square, but the user accidentally causes additional inputs that did not follow the shape of the square, erroneous sample or data points would be initially generated. Specifically, if the line created by the user was not straight (too much wiggle in the line), the sample or data points that were outside the straight line could be considered erroneous sample or data points. Therefore, redundant and erroneous data points can be removed and thus fewer data points are sent to the destination client node. The collaboration server also includes logic to generate multiple versions of the intermediate representation at different resolutions (or fidelity levels). For example, the collaboration server can generate low resolution, medium resolution and high-resolution versions of the intermediate representation. The number of "levels" is not limited to a specific number. The collaboration server can send the intermediate representation at appropriate resolution that corresponds to respective zoom levels at client nodes. The technology disclosed can reduce the amount of data transmitted during a collaboration session by only sending the intermediate representation at the required resolution level to destination client nodes.

Some key elements of the collaboration system are presented below, followed by details of the technology disclosed.

Virtual Workspace

In order to support an unlimited amount of spatial information for a given collaboration session, the technology disclosed provides a way to organize a virtual space termed the "workspace". The workspace can be characterized by a multi-dimensional and in some cases two-dimensional plane with essentially unlimited extent in one or more dimensions for example, in such a way that new content can be added to the space. The content can be arranged and rearranged in the space, and a user can navigate from one part of the space to another.

Digital assets (or objects), as described above in more detail, are arranged on the virtual workspace (or shared virtual workspace). Their locations in the workspace are important for performing the gestures. One or more digital displays in the collaboration session can display a portion of the workspace, where locations on the display are mapped to locations in the workspace. The participants of the collaboration session can draw graphical shapes on the digital assets or annotate on the digital assets or any other location on the workspace. The drawn shapes or objects can also be their own independent digital asset. When a first user is drawing a graphical shape, the client node generates and/or receives raw data input by the user and converts the input into a lightweight intermediate representation or stroke data which is then sent to the server node for processing and onward propagation to other client nodes where the graphical shape is rendered by respective client nodes so that other participants can view the input provided by the first user.

Viewport

One or more digital displays in the collaboration session can display a portion of the workspace, where locations on the display are mapped to locations in the workspace. A mapped area, also known as a viewport within the workspace is rendered on a physical screen space. Because the entire workspace is addressable using coordinates of locations, any portion of the workspace that a user may be viewing itself has a location, width, and height in coordinate space. The concept of a portion of a workspace can be referred to as a "viewport". The coordinates of the viewport are mapped to the coordinates of the screen space. The coordinates of the viewport can be changed which can change the objects contained within the viewport, and the change would be rendered on the screen space of the display client. Details of workspace and viewport are presented in our U.S. application Ser. No. 15/791,351, entitled, "Virtual Workspace Including Shared Viewport Markers in a Collaboration System," filed Oct. 23, 2017, which is incorporated by reference and fully set forth herein. Participants in a collaboration session can use digital displays of various sizes ranging from large format displays of sizes five feet or more and small format devices that have display sizes of a few inches. One participant of a collaboration session may share content (or a viewport) from their large format display, wherein the shared content or viewport may not be adequately presented for viewing on the small format device of another user in the same collaboration session. The technology disclosed can automatically adjust the zoom sizes of the various display devices so that content is displayed at an appropriate zoom level. The users can also adjust the zoom level of the digital display as desired. For example, a user can zoom in to view a particular digital asset or a portion of a particular digital asset in details. This can impact the graphical annotations or drawings on the workspace. When the viewport of a user's digital display is zoomed out, fewer sample points may be sufficient to generate an annotation or a graphical drawing. However, when the viewport is zoomed in more details of the same graphical drawing or annotation are required to correctly render the graphical drawing or the annotation. The technology disclosed can use this information for a participant's display (i.e., the zoom level) to determine the fidelity level at which the stroke data needs to be sent to that client node. Higher fidelity stroke data is sent to the client node with a zoomed in view of the workspace while lower fidelity stroke data is sent to the client node with a zoomed-out view of the workspace. Further details of how the fidelity level of the stroke data to be sent is determined is provided in the following sections.

Spatial Event Map

Participants of the collaboration session can work on the workspace (or virtual workspace) that can extend in two dimensions (along x and y coordinates) or three dimensions (along x, y, z coordinates). The size of the workspace can be extended along any dimension as desired and therefore can considered as an "unlimited workspace". The technology disclosed includes data structures and logic to track how people (or users) and devices interact with the workspace over time. The technology disclosed includes a so-called "spatial event map" to track interaction of participants with the workspace over time. The spatial event map contains information needed to define digital assets and events in a workspace. It is useful to consider the technology from the point of view of space, events, maps of events in the space, and access to the space by multiple users, including multiple simultaneous users. The spatial event map can be considered (or represent) a sharable container of digital assets that can be shared with other users. The spatial event map includes location data of the digital assets in a two-dimensional or a three-dimensional space. The technology disclosed uses the location data and other information about the digital assets (such as the type of digital asset, shape, color, etc.) to display digital assets on the digital display linked to computing devices used by the participants of the collaboration session.

A spatial event map contains content in the workspace for a given collaboration session. The spatial event map defines arrangement of digital assets on the workspace. Their locations in the workspace are important for performing gestures. The spatial event map contains information needed to define digital assets, their locations, and events in the workspace. A spatial events map system, maps portions of workspace to a digital display e.g., a touch enabled display. Details of workspace and spatial event map are presented in our U.S. application Ser. No. 14/090,830, entitled, "Collaboration System Including a Spatial Event Map," filed Nov. 26, 2013, now issued as U.S. Pat. No. 10,304,037, which is included in this application and fully set forth herein.

The information related to the intermediate representation of digital assets can be included in the spatial event map. For example, the spatial event map can include sample points defining the path and parameters such as color, width, position, of the digital asset. The spatial event map can also include "interpolation type" such as Bezier, Spline, etc. that can be used in rendering the digital asset at the client nodes. The spatial event map can include the resolution-level at which the collaboration server sends the digital asset to a client node. For example, the collaboration server can send the intermediate representation of a digital asset at an appropriate resolution such as high, medium or low resolution matching the zoom level at the client node.

The server node (or server-side node or server-side network node) provides at least a portion of the spatial event map identifying events in the virtual workspace to client nodes (or client-side nodes or client-side network nodes). The spatial event map allows for displaying or rendering a portion of the shared virtual workspace in the display space on the display of the client nodes. The shared virtual workspace can include one or more digital assets. As updates are detected to the shared virtual workspace in response to input events at one or more client nodes, the server node sends update events to spatial event maps at the other client nodes.

The client node receives, from the server node, at least a portion of the spatial event map identifying events in the virtual workspace. The spatial event map allows the client node to display or render at least a portion of the shared virtual workspace. The shared virtual workspace can include one or more digital assets. The client node can send update events to server node in response to input events at the client node. The client node can receive updates events from the server node in response to input events at one or more other client nodes.

Space

In order to support an unlimited amount of spatial information for a given collaboration session, the technology disclosed provides a way to organize digital assets in a virtual space termed as the workspace, which can, for example, be characterized by a 2-dimensional plane (along X-axis and Y-axis) with essentially unlimited extent in one or both dimensions, for example. The workspace is organized in such a way that new content such as digital assets can be added to the space, that content can be arranged and rearranged in the space, that a user can navigate from one part of the space to another, and that a user can easily find needed things in the space when it is needed. The technology disclosed can also organize content on a 3-dimensional workspace (along X-axis, Y-axis, and Z-axis).

Events

Interactions with the workspace can be handled as events. People, via tangible user interface devices, and systems can interact with the workspace. Events have data that can define or point to a target digital asset to be displayed on a physical display, and an action as creation, modification, movement within the workspace and deletion of a target digital asset, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content and the understanding of how the spatial data evolves over time. Also, the spatial event map can have a reasonable size in terms of the amount of data needed, while also defining an unbounded workspace.

Environment

FIG. 1 illustrates example aspects of a digital display collaboration environment. In the example, a plurality of users 101*a*, 101*b*, 101*c*, 101*d*, 101*e*, 101*f*, 101*g* and 101*h* (collectively 101) may desire to collaborate with each other when reviewing various types of content including digital assets including documents, images, videos and/or web applications or websites. The plurality of users may also desire to collaborate with each other in the creation, review, and editing of digital assets such as complex images, music, video, documents, and/or other media, all generally designated in FIG. 1 as 103*a*, 103*b*, 103*c*, and 103*d* (collectively 103). The participants or users in the illustrated example use a variety of computing devices configured as electronic network nodes, in order to collaborate with each other, for example a tablet 102*a*, a personal computer (PC) 102*b*, many large format displays 102*c*, 102*d*, 102*e* (collectively devices 102). The participants can also use one or more mobile computing devices and/or tablets with small format displays to collaborate. In the illustrated example the large format display 102*c*, which is sometimes referred to herein as a "wall", accommodates more than one of the users, (e.g., users 101*c* and 101*d*, users 101*e* and 101*f*, and users 101*g* and 101*h*).

In an illustrative embodiment, a display array can have a displayable area usable as a screen space totaling on the order of 6 feet in height and 30 feet in width, which is wide enough for multiple users to stand at different parts of the wall and manipulate it simultaneously. It is understood that large format displays with displayable area greater than or less than the example displayable area presented above can be used by participants of the collaboration system. The user devices, which are referred to as client nodes, have displays on which a screen space is allocated for displaying events in a workspace. The screen space for a given user may comprise the entire screen of the display, a subset of the screen, a window to be displayed on the screen and so on, such that each has a limited area or extent compared to the virtually unlimited extent of the workspace.

The collaboration system of FIG. 1 includes a data processing engine 110 which includes logic to receive data (e.g., raw data and/or intermediate data, as described above) from client nodes, process the received data to generate intermediate, filtered, selected and/or graphical data and then send the generated intermediate, filtered, selected and/or graphical data to client nodes. These operations can be performed on the server node, such that the data processing engine 110 is part of the server node. As mentioned above, the data processing engine 110 sends an intermediate representation of graphical drawings or annotations to client nodes (or client nodes) for rendering and/or displaying graphical data on their respective display devices. This intermediate representation data can also be referred to as stroke data (e.g., data about drawing strokes made by a user). The data processing engine 110 can remove erroneous sample points from the data. Such sample points are unintentionally entered or created by the user when drawing graphical shapes or annotations. The data processing engine 110 can remove redundant sample points from stroke data. The redundant sample points can be generated at the destination client node by applying an appropriate interpolation technique. The redundant data points are not needed to recreate the graphical shape, graphical drawings or annotation at the destination client node. In other words, redundant sample points can be points that do not necessarily need to be provided to the client node because the client node can use interpolation based on other data points to "fill in" information of the redundant data points that were removed. For example, the redundant data points are points that can be removed by the server and can be regenerated by applying an interpolation technique on adjacent data points (e.g., data points that are/were adjacent to the redundant data points that were removed). A data point or a sample point in the stroke data is a location on workspace mapped to the display screen linked to a client node. The data processing engine 110 can generate graphical data at various fidelity levels and provides the graphical data to a client node at a fidelity level that matches and/or is associated with the current zoom level of the digital display at the destination client node. Further details of the logic implemented in data processing engine 110 is provided with reference to the process flowchart in FIG. 5 and the architectural diagram in FIG. 6.

Figure 2:
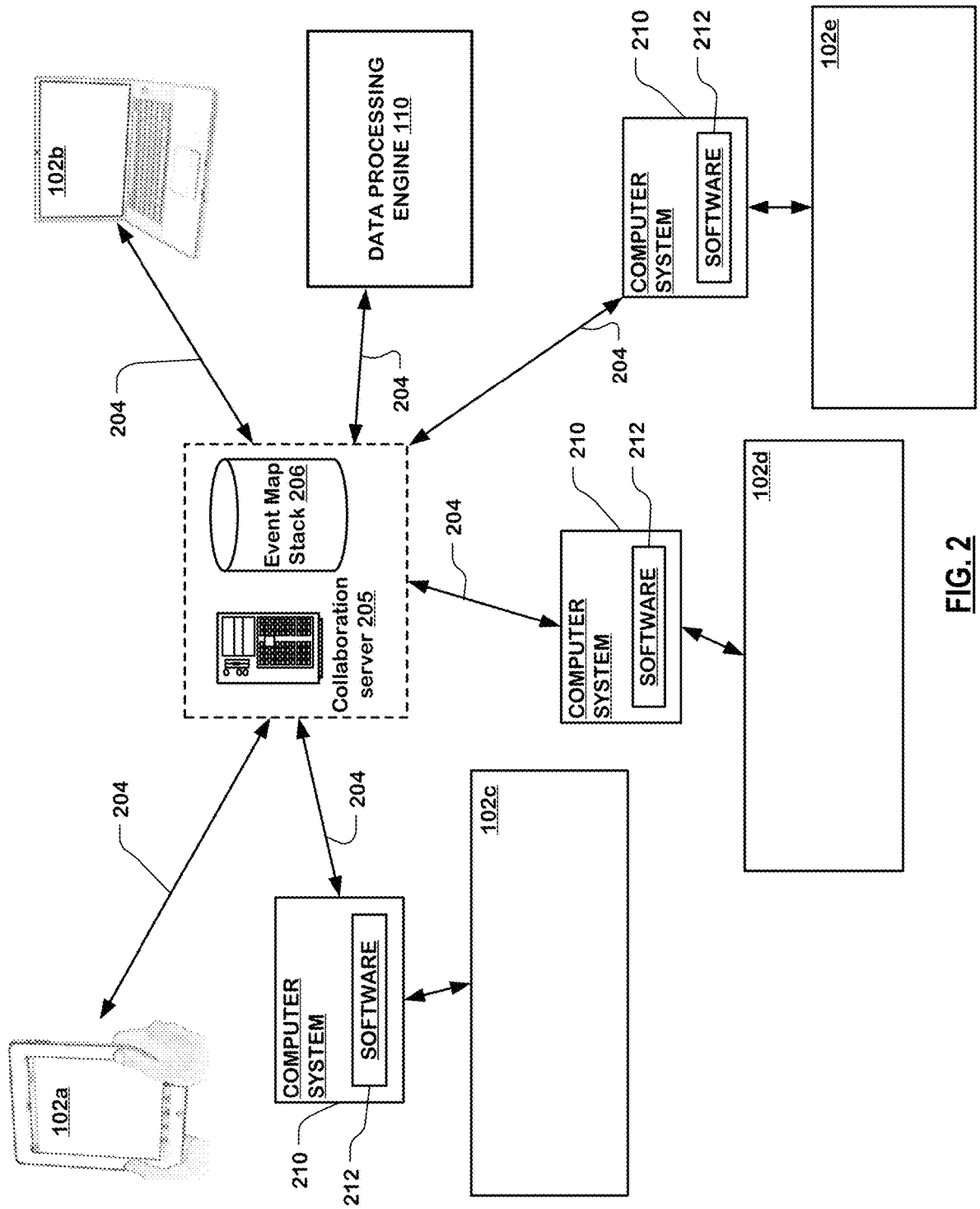

FIG. 2 shows a collaboration server 205 (also referred to as the server node or the server node) and a database 206 that can constitute a server node. The server node is configured with logic to receive stroke data from a client node and process this data prior to propagating to other client nodes in the collaboration session. Similarly, FIG. 2 shows client nodes (or client nodes) that can include computing devices such as desktop and laptop computer, hand-held devices such as tablets, mobile computers, smart phones, and large format displays that are coupled with computer system 210. Participants of the collaboration session can use a client node to participate in a collaboration session.

FIG. 2 illustrates additional example aspects of a digital display collaboration environment. As shown in FIG. 1, the large format displays 102*c*, 102*d*, 102*e* sometimes referred to herein as "walls" are controlled by respective client, communication networks 204, which in turn are in network communication with a central collaboration server 205 configured as a server node or nodes, which has accessible thereto a database 206 storing spatial event map stacks for a plurality of workspaces. The database 206 can also be referred to as an event map stack or the spatial event map as described above. The data processing engine 110 can be implemented as part of the collaboration server 205 or it can be implemented separately and can communicate with the collaboration server 205 via the communication networks 204.

As used herein, a physical network node is an active electronic device that is attached to a network, and is capable of sending, receiving, or forwarding information over a communication channel. Examples of electronic devices which can be deployed as network nodes, include all varieties of computers, workstations, laptop computers, handheld computers and smart phones. As used herein, the term "database" does not necessarily imply any unity of structure. For example, two or more separate databases, when considered together, still constitute a "database" as that term is used herein.

The application running at the collaboration server 205 can be hosted using software such as Apache or nginx, or a runtime environment such as node.js. It can be hosted for example on virtual machines running operating systems such as LINUX. The collaboration server 205 is illustrated, heuristically, in FIG. 2 as a single computer. However, the architecture of the collaboration server 205 can involve systems of many computers, each running server applications, as is typical for large-scale cloud-based services. The architecture of the collaboration server 205 can include a communication module, which can be configured for various types of communication channels, including more than one channel for each client in a collaboration session. For example, with near-real-time updates across the network, client software can communicate with the server communication module using a message-based channel, based for example on the Web Socket protocol. For file uploads as well as receiving initial large volume workspace data, the client software 212 (as shown in FIG. 2) can communicate with the collaboration server 205 via HTTPS. The collaboration server 205 can run a front-end program written for example in JavaScript served by Ruby-on-Rails, support authentication/authorization based for example on OAuth, and support coordination among multiple distributed clients. The collaboration server 205 can use various protocols to communicate with client nodes and webserver 130. Some examples of such protocols include REST-based protocols, low latency web circuit connection protocol and web integration protocol. Details of these protocols and their specific use in the co-browsing technology is presented below. The collaboration server 205 is configured with logic to record user actions in workspace data, and relay user actions to other client nodes as applicable. The collaboration server 205 can run on the node.JS platform for example, or on other server technologies designed to handle high-load socket applications.

The database 206 stores, for example, a digital representation of workspace data sets for a spatial event map of each session where the workspace data set can include or identify events related to objects displayable on a display canvas, which is a portion of a virtual workspace. The database 206 can store digital assets and information associated therewith, as well as store the raw data, intermediate data and graphical data at different fidelity levels, as described above. A workspace data set can be implemented in the form of a spatial event stack, managed so that at least persistent spatial events (called historic events) are added to the stack (push) and removed from the stack (pop) in a first-in-last-out pattern during an undo operation. There can be workspace data sets for many different workspaces. A data set for a given workspace can be configured in a database or as a machine-readable document linked to the workspace. The workspace can have unlimited or virtually unlimited dimensions. The workspace data includes event data structures identifying digital assets displayable by a display client in the display area on a display wall and associates a time and a location in the workspace with the digital assets identified by the event data structures. Each device 102 displays only a portion of the overall workspace. A display wall has a display area for displaying objects, the display area being mapped to a corresponding area in the workspace that corresponds to a viewport in the workspace centered on, or otherwise located with, a user location in the workspace. The mapping of the display area to a corresponding viewport in the workspace is usable by the display client to identify digital assets in the workspace data within the display area to be rendered on the display, and to identify digital assets to which to link user touch inputs at positions in the display area on the display.

The collaboration server 205 and database 206 can constitute a server node, including memory storing a log of events relating to digital assets having locations in a workspace, entries in the log including a location in the workspace of the digital asset of the event, a time of the event, a target identifier of the digital asset of the event, as well as any additional information related to digital assets, as described herein. The collaboration server 205 can include logic to establish links to a plurality of active client nodes (e.g., devices 102), to receive messages identifying events relating to modification and creation of digital assets having locations in the workspace, to add events to the log in response to said messages, and to distribute messages relating to events identified in messages received from a particular client node to other active client nodes.

The logic in the collaboration server 205 can comprise an application program interface, including a specified set of procedures and parameters, by which to send messages carrying portions of the log to client nodes, and to receive messages from client nodes carrying data identifying events relating to digital assets which have locations in the workspace. Also, the logic in the collaboration server 205 can include an application interface including a process to distribute events received from one client node to other client nodes.

The events compliant with the API can include a first class of event (history event) to be stored in the log and distributed to other client nodes, and a second class of event (ephemeral event) to be distributed to other client nodes but not stored in the log.

The collaboration server 205 can store workspace data sets for a plurality of workspaces and provide the workspace data to the display clients participating in the session. The workspace data is then used by the computer systems 210 with appropriate software 212 including display client software, to determine images to display on the display, and to assign digital assets for interaction to locations on the display surface. The server 205 can store and maintain a multitude of workspaces, for different collaboration sessions. Each workspace can be associated with an organization or a group of users and configured for access only by authorized users in the group.

In some alternatives, the collaboration server 205 can keep track of a "viewport" for each device 102, indicating the portion of the display canvas (or canvas) viewable on that device, and can provide to each device 102 data needed to render the viewport. The display canvas is a portion of the virtual workspace. Application software running on the client device responsible for rendering drawing objects, handling user inputs, and communicating with the server can be based on HTML5 or other markup-based procedures and run in a browser environment. This allows for easy support of many different client operating system environments.

The user interface data stored in database 206 includes various types of digital assets including graphical constructs (drawings, annotations, graphical shapes, etc.), image bitmaps, video objects, multi-page documents, scalable vector graphics, and the like. The devices 102 are each in communication with the collaboration server 205 via a communication network 204. The communication network 204 can include all forms of networking components, such as LANs, WANs, routers, switches, Wi-Fi components, cellular components, wired and optical components, and the internet. In one scenario two or more of the users 101 are located in the same room, and their devices 102 communicate via Wi-Fi with the collaboration server 205.

In another scenario two or more of the users 101 are separated from each other by thousands of miles and their devices 102 communicate with the collaboration server 205 via the internet. The walls 102c, 102d, 102e can be multi-touch devices which not only display images, but also can sense user gestures provided by touching the display surfaces with either a stylus or a part of the body such as one or more fingers. In some embodiments, a wall (e.g., 102c) can distinguish between a touch by one or more fingers (or an entire hand, for example), and a touch by the stylus. In one embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 102c may, for example, be an array of Model No. MT553UTBL MultiTaction Cells, manufactured by MultiTouch Ltd, Helsinki, Finland, tiled both vertically and horizontally. In order to provide a variety of expressive means, the wall 102c is operated in such a way that it maintains a "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

Process for Sending and Receiving Stroke Data

Figure 3:
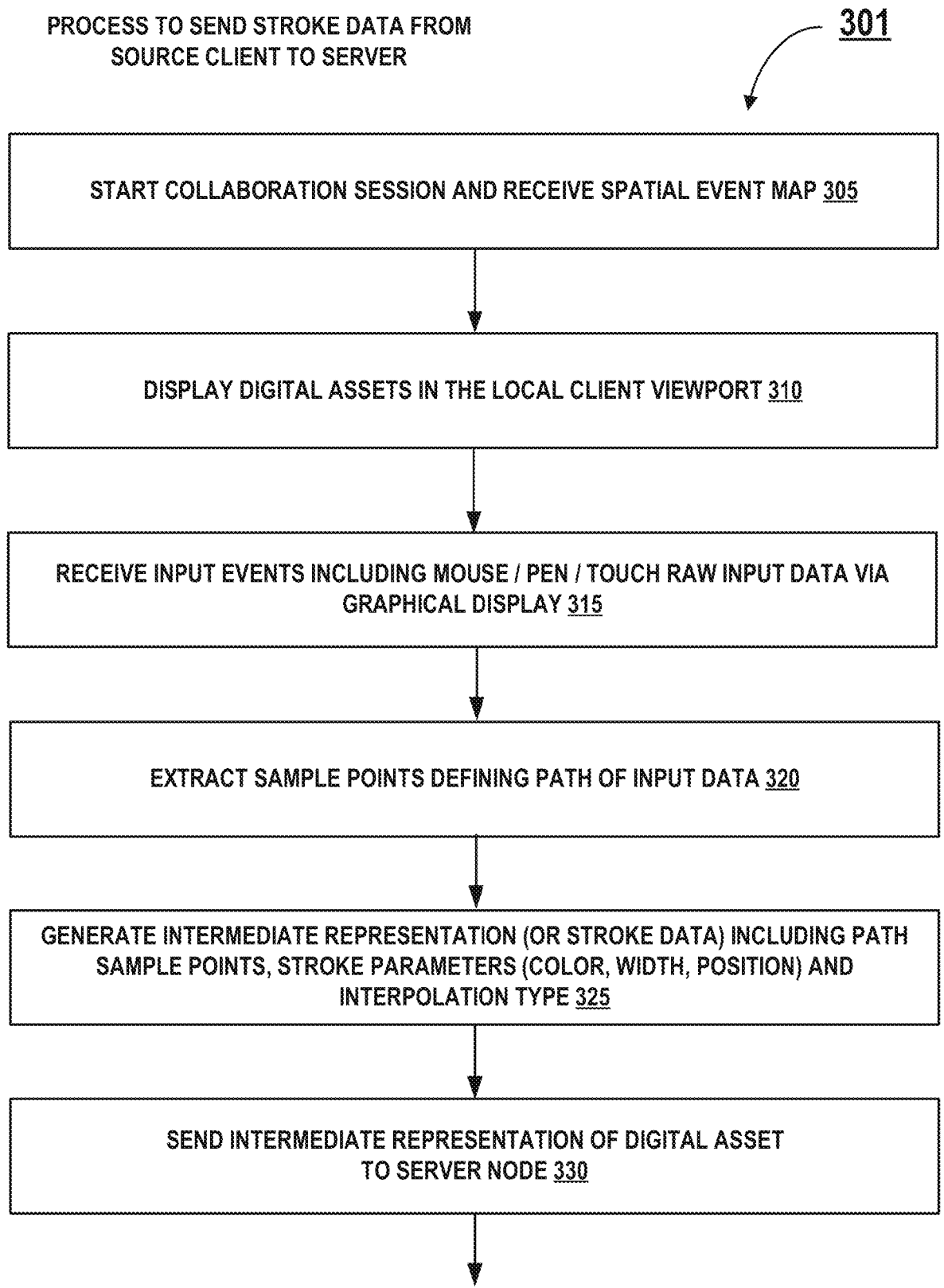
FIG. 3 presents a simplified flow diagram for processing user input received at a first client node at which a participant of a collaboration session can provide input via a graphical user interface.

FIG. 3 presents a process flowchart that illustrates an implementation of operations at the first (or a source) client node for generating intermediate representation of a digital asset using raw inputs (such as provided (input) and/or generated by a user) received via the graphical display. FIG. 3 presents a process flowchart that illustrates operations at the second (or remote or destination) client node to receive intermediate representation of the digital asset and render it on the graphical display. When a collaboration session is initiated, each respective client node displays digital assets that are within their respective viewport.

Client-Side Process for Sending and Receiving Stroke Data at Client Nodes

FIG. 3 is a simplified flow diagram 301 for processing user input received at a first client node at which a participant of a collaboration session can provide input via a graphical user interface that is displaying a portion (e.g., a canvas) of a virtual workspace that can include digital assets. The input received via the graphical display can be a drawing, annotation, etc.

The order illustrated in the simplified flow diagram 301 (in FIG. 3) is provided for the purposes of illustration, and can be modified as suits a particular implementation. Many of the steps, for example, can be executed in parallel. In this implementation, historic and ephemeral events that occur within the workspace are received by some or all of the users within the workspace. It is to be noted that a server implementing the collaboration system can include logic for determining how much (e.g., some or all) of the historic and ephemeral events are sent to the other users. As described below, these historic and ephemeral events can be sent in the form of a spatial event map. Some or all of the spatial event map can be transmitted to other users. The determination of what portions of the spatial event map are to be sent can depend on the size of the spatial event map, the bandwidth between the server and the clients, the usage history of the clients, the number of clients, as well as any other factors that could contribute to providing a balance of latency and usability. In one implementation, all users in the workspace will receive all historic and ephemeral events that occur within that workspace (e.g., the entire spatial event map). In another implementation, only the historic and ephemeral events that occur in specific viewports of the clients will be transmitted to the clients. The workspace can be, in essence, limitless, while a viewport for a client has a specific location and dimensions in the workspace. A plurality of client nodes can be collaborating within the workspace with overlapping viewports. The client nodes can receive and log the events relating to the digital assets that have coordinates outside of their viewport.

In this example, a first client node establishes communication with the collaboration server. A second client node also establishes communication with the collaboration server, thus allowing the first and the second client nodes to participate in a collaboration session with each other. The collaboration session is facilitated by the collaboration server (operation 305). Operation 305 can include logging in to the collaboration session facilitated by the collaboration server, and communication through the collaboration server to the other network nodes, or other communication pathways. For initialization, the first client node receives collaboration data, such as a spatial event map in the form of a log of the historic events that have occurred within the workspace, or other data structure that identifies the location of digital assets in the workspace. The first client node also receives, for example, as a part of the log of historic events or otherwise, a list of other client nodes participating in the collaboration session. The first client node can store the collaboration data identifying digital assets having locations in a virtual workspace used in the collaboration session.

As part of this initialization, the first client node can instantiate an initial "vc" (Viewport Change) record and communicate this record to other participant clients in the workspace. The initial "vc" record can be retrieved from the log from a previous session. The initial "vc" record can also be a default "vc" record within the workspace or can be instantiated by some other method such as logic to identify the most used area of the workspace.

The first client node maps the local client viewport having a location and dimensions within the virtual workspace to a local client screen space and renders and/or displays digital assets having locations in the local client viewport to the local screen space as a function of the mapping (operation 310). Participants of the collaboration session can share digital assets with other participants in the virtual workspace (also referred to as a shared workspace). The digital assets can be documents such as word processor files, spreadsheets, slide decks, notes, program code, etc. Digital assets can also be graphical objects such as images, videos, line drawings, annotations, graphical shapes, etc.

The client node includes logic to receive input events e.g., mouse events, pen events, touch events, etc. via graphical display linked to the first client node (operation 315). The input received via these input events is displayed on a display linked to the first client node as the user performs the input events and that will eventually be rendered for display on the second client node. This input, as drawn by the user of the first client node, becomes a digital asset within the workspace. The input data can be entered using mouse or other graphical input tools such as pen etc. The system can also receive input data as touch on an interactive graphical display connected to the client node. The system includes logic to extract sample (data) points from the input data, as received from the graphical display at an operation 320. These sample points define a path of the input as received from graphical display linked to the first client node. The path is a set of points that define a shape. The sample points are coordinates in a two-dimensional or three-dimensional space. A path can be open such as a line or closed forming a shape.

The client node includes logic to generate an intermediate representation of digital assets. The intermediate representation (also referred to as stroke data or data) comprises sample points representing path of the input and parameters (or stroke parameters or parameters) that provide additional information about the digital asset (operation 325). The parameters can include a width, color, position and other properties of the digital asset. The stroke parameters can be used to define visual effects attached to digital assets.

The client node includes logic to send the intermediate representation of the digital asset to the collaboration server at an operation 330. The intermediate representation of digital asset can include sample points representing the path, and parameters such as the color, width, and position of the digital asset. The intermediate representation can also include an interpolation type or interpolation algorithm that can be used to render the digital asset. Examples of interpolation type include Bezier, Spline, etc. Interpolation is a method of curve fitting to construct new data points within the range of known data points. The second client node can use the interpolation type specified in the intermediate representation to construct new data points within the range of sample points in the intermediate representation to render the digital asset on the graphical display. Alternatively, the client node can send raw data to the collaboration server and the collaboration server can generate the intermediate representation.

It is understood that other types of data can be included in the intermediate representation and sent to collaboration server. Such data can be related to the digital asset or metadata related to the digital asset. The intermediate representation of the digital asset can be sent to the collaboration server as update events to the spatial event map. The system can use APIs to send and receive intermediate representation of digital assets to/from the collaboration server.

Figure 4:
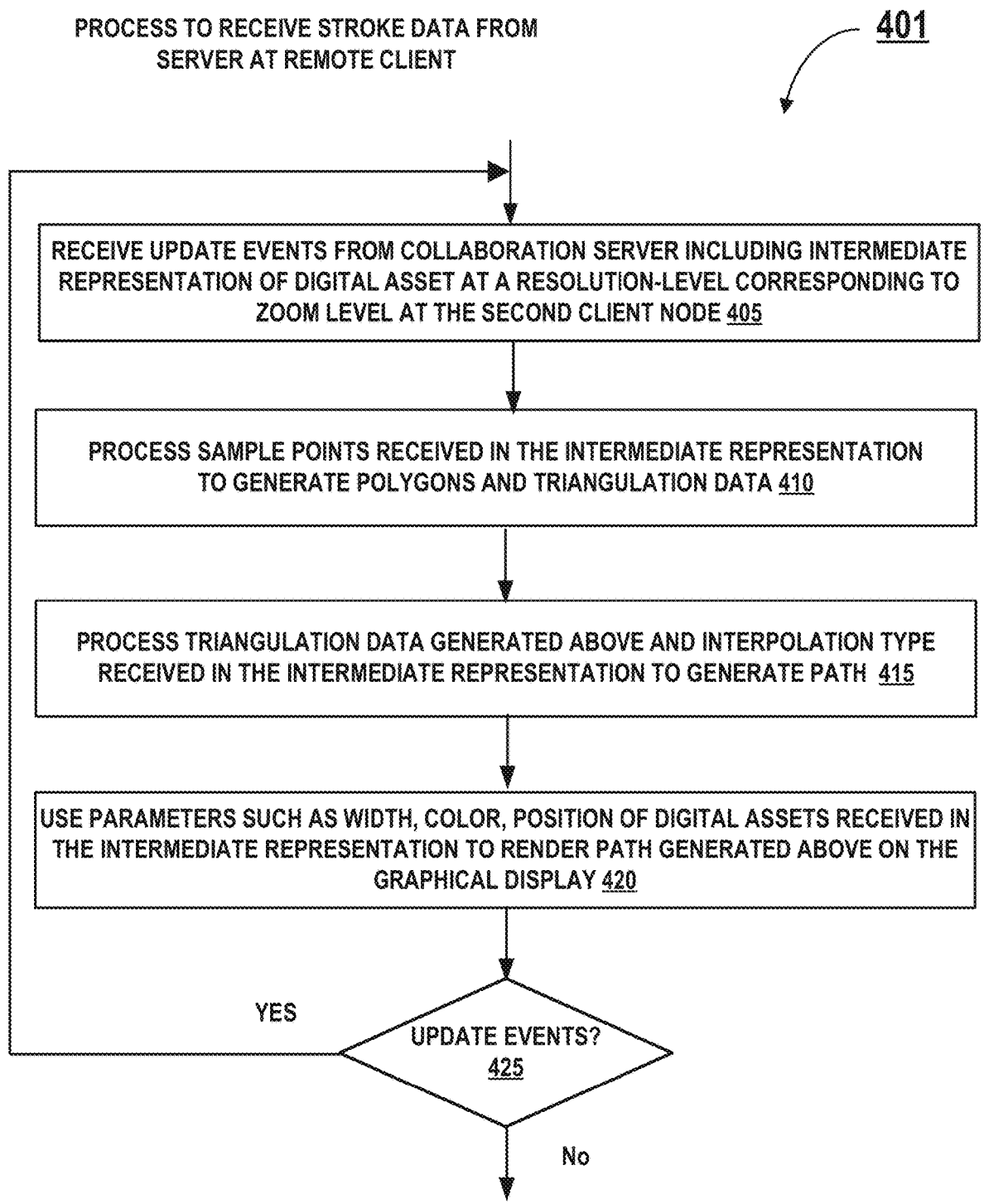
FIG. 4 presents a simplified flow diagram for processing an intermediate representation of digital assets received by the second (or remote) client node in a collaboration session.

FIG. 4 is a simplified flow diagram 401 for processing intermediate representation of digital assets received by the second (or remote) client node in a collaboration session.

FIG. 4 presents process performed by the second client node upon receiving intermediate representation of a digital asset to render and/or display the digital asset on a graphical display. This process is presented in the flow diagram 401 in FIG. 4. Note that it assumed that collaboration session is already established and a spatial event map is received by the second client node prior to the operations shown in the flow diagram 401.

The client node includes logic to receive update events from the collaboration server including intermediate representation of digital assets (operation 405). The intermediate representation or graphical data that includes sample points representing the path and parameters such as color, width and position of digital asset. The intermediate representation or graphical data can also include interpolation type that can be used to render the path on the graphical display. The intermediate representation or graphical data received from the collaboration server can be selected, in part, to correspond to a specific zoom level at the user of the second (remote/destination/target) client node is viewing the viewport. For example, for a client node that does not need or desire a high-resolution (fidelity) version of the digital asset, the server can send low resolution (fidelity) or medium resolution (fidelity) versions or portions of the intermediate representation. Such intermediate representation or graphical data can include partial sample points but still maintain the path directions and shapes. However, the low-resolution intermediate representation is sufficient for rendering on the remote client node when the viewport is zoomed further out, such that display of the fine details of the digital asset is not required or desired by the user. In such case, low resolution data can be used to render the digital asset as the digital asset is small in a zoomed-out view. Rendering a low-resolution digital asset can save processing time, memory consumption etc. at the remote client node. Further, the low-resolution version or portion of the intermediate representation requires less information to be transmitted to the remote/destination client node as opposed to the high-resolution version or portion of the intermediate representation. As such, less bandwidth is required for the collaboration. The server node can send one of the low-fidelity graphical data, the medium-fidelity graphical data and the high-fidelity graphical data to the client node in dependence on the current zoom level of the second client node. The server node can two of the low-fidelity graphical data, the medium-fidelity graphical data and the high-fidelity graphical data to the client node in dependence on the current zoom level of the second client node.

In an embodiment, if the remote/destination client node has already received the low resolution version or portion of the intermediate representation and the user then decides to zoom in on the digital asset, the collaboration server can then send only portions of the intermediate representation that is necessary to achieve the high resolution version or portion of the digital asset, thus saving transmission bandwidth by only transmitting the additional intermediate representation that is necessary to go from the low resolution version or portion to the high resolution version or portion of the intermediate representation. Further, a high-resolution version or portion of the intermediate representation can contain all sample points and may be required when the remote client node has a display that is zoomed-in and requires high resolution intermediate representation for rendering the path.

The client node includes logic to process the sample points in the intermediate representation received from the collaboration server to generate polygons and/or triangulation data (operation 410). The triangulation data (such as triangles) and interpolation type can be sent to a GPU or any other types of processors to generate path (operation 415).

The client node includes logic to render and/or display the path on the graphical display connected to the first client node (operation 420). The client node includes logic to use parameters such as width, color and position of the digital asset when rendering the path on the graphical display.

The client node can then receive further inputs from the graphical display connected to the client node. The inputs can include edits to the one or more digital assets displayed on the graphical display. Such inputs can generate update events at respective client nodes. The updates events are received by the server node and then propagated to other client nodes allowing them to display and/or render updated digital assets on the shared virtual workspace. If the client node receives an update event from the server node ("yes" branch at an operation 425), the operations of the process continue at the operation 405. Otherwise, the process terminates when the collaboration session ends ("no" branch at an operation 425).

Client Process for Sending and Receiving Stroke Data at Client Nodes

Figure 5:
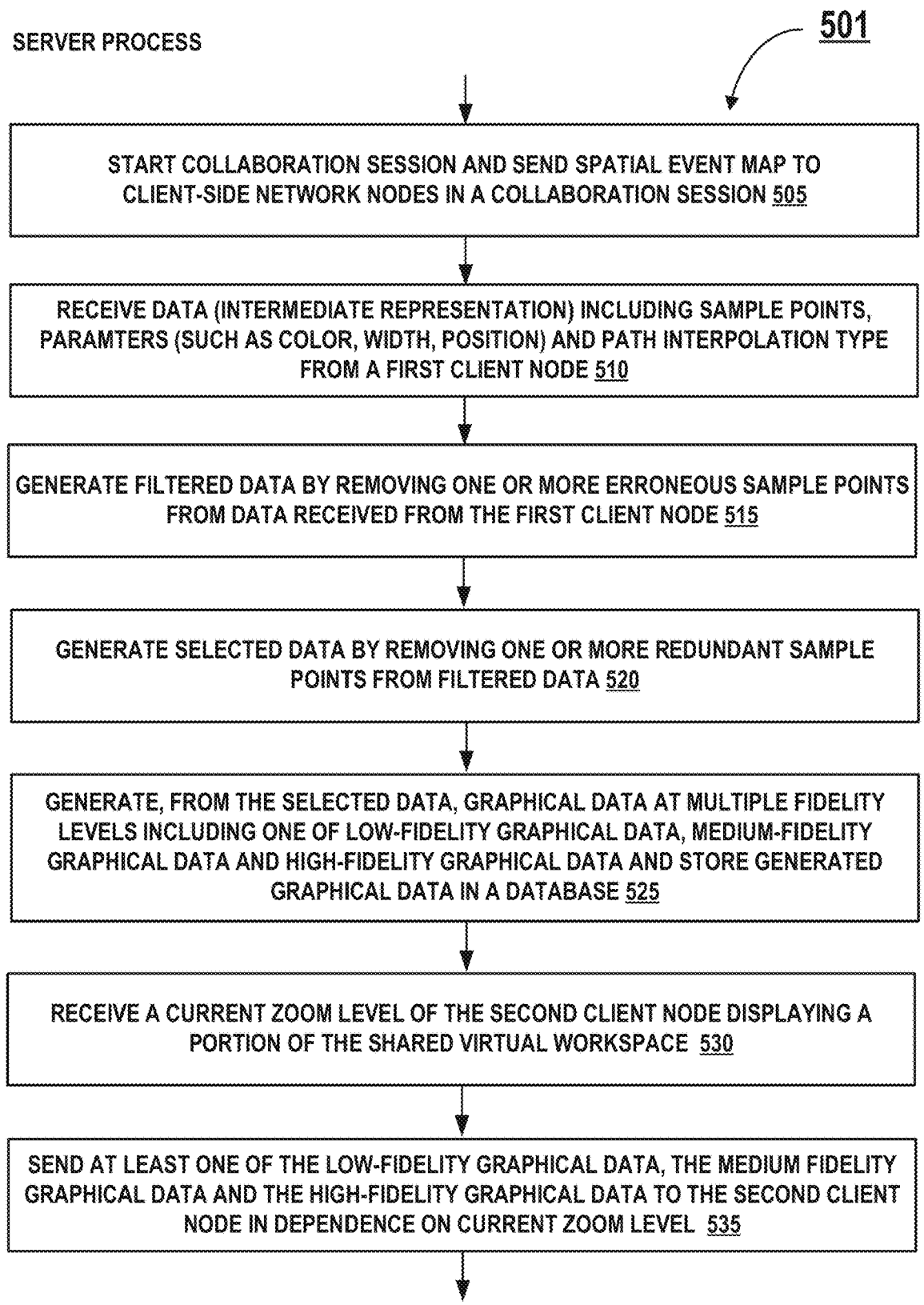
FIG. 5 presents a simplified flow diagram including operations performed by a collaboration server to process an intermediate representation of a digital asset.

FIG. 5 presents a flowchart 501 illustrating operations performed by the collaboration server (or server node) to process the data (intermediate representation of digital assets) received from a first client node participating in a collaboration session using a shared virtual workspace. The collaboration server can generate graphical data at multiple fidelity levels. The collaboration server can send graphical data to other client nodes at in dependence on their respective zoom levels. The details of the operations performed by the collaboration server are presented below.

The process in FIG. 5 starts by establishing a collaboration session between client nodes (operation 505). The collaboration server (or server node) sends the spatial event map or at least a portion of the spatial event map to client nodes participating in the collaboration session. The collaboration server receives data from a first client node participating in the collaboration session (operation 510). The data received from the first client node (or source client node) can correspond to intermediate representation of a digital. The data can be received by the server node can be received as an updated event of the spatial event map. The update event can be sent from the from the first client node or it can be sent (or transmitted) directly by the first client node to the server node. The intermediate representation of the sample points corresponding to the sample points entered at the first client node. The size of data corresponding to the intermediate representation of sample points is less than a size of the data corresponding to the sample points entered at the first client node. The intermediate representation of the digital asset can include sample points defining a path, and other parameters such as color, width, and position of the digital asset. The intermediate representation can also include interpolation type for rendering the digital asset.

The collaboration server (or server node) includes logic to generate filtered data by removing one or more erroneous sample points from the data received from the first client node participating in the collaboration session (operation 515). The one or more erroneous sample points can represent one or more sample points determined to be unintentionally entered at the first client node during the collaboration session. The erroneous sample points can represent stroke data that is unintentionally entered by the user when drawing a graphical object, a graphical shape, an annotation, etc. For example, when drawing a straight line, the user may start drawing (e.g., using a pen, pencil, touch pointer, light pointer, a finger, etc.) from a starting point but before reaching the ending point, the pointer may abruptly move side-ways due to e.g., a sudden jerk in the movement of the hand. The user can continue drawing the straight line until reaching the ending point, however, a small part of the sample points corresponding to the graphical shape can represent erroneous data points due to sudden jerk of the movement of the pointer device or the finger on a touch-enabled digital display. The data processing engine 110 includes logic to detect such erroneous data points and remove these erroneous data points before further processing the data.

The collaboration server can generate selected data by removing one or more redundant sample points from the filtered data (operation 520). A redundant sample point represents a sample point, of the filtered data, that can be regenerated from one or more adjacent sample points, of the filtered data, using interpolation The redundant sample points are not needed when rendering (or recreating) the digital asset on the second (remote, destination, or target) client node. The redundant sample points can be generated at the destination client node by applying an appropriate interpolation technique. The redundant data points are not needed to recreate the graphical shape, graphical drawings or annotation at the destination client node. In other words, redundant sample points can be points that do not necessarily need to be provided to the client node because the client node can use interpolation based on other data points to "fill in" information of the redundant data points that were removed. For example, the redundant data points are points that can be removed by the server and can be regenerated by applying an interpolation technique on adjacent data points (e.g., data points that are/were adjacent to the redundant data points that were removed). A data point or a sample point in the stroke data is a location on workspace mapped to the display screen linked to a client node. The redundant sample points that are removed by the server node can be generated from adjacent data points using a data interpolation technique. The graphical data sent to the destination client node can include an interpolation type of a path represented by sample points in the data. The interpolation type (or the interpolation technique) is applied by the client node to recreate the graphical shape. Examples of interpolation types include Bezier, Spline, etc. that can be used for rendering the graphical shapes, drawings, annotations, etc. at the destination client node. By removing the erroneous and redundant sample points, the technology disclosed reduces the amount of data to be provided by the server node to the client nodes, thus reducing latency and improving the quality of collaboration sessions or online whiteboarding sessions.

The collaboration server (or server node) includes logic to generate, from the selected data, graphical data at multiple fidelity levels. For example, the collaboration server can generate graphical data at multiple fidelity levels including at least one of low-fidelity graphical data, medium-fidelity graphical data and high-fidelity graphical data. The low-fidelity graphical data is generated by reducing the resolution of the digital asset (i.e., the graphical shape, drawing or annotation, etc.). In one implementation, the collaboration server can select fewer points from the sample points to render a low resolution or low-fidelity version of the digital asset (low fidelity graphical data). The number or percentage of sample points reduced to generate the low-fidelity (low fidelity graphical data), medium-fidelity (medium fidelity graphical data) and high-fidelity (high fidelity graphical data) versions depends on the original data or source data of the digital asset and tolerance settings of the system. For example, a low-fidelity version can be generated by reducing the number of sample points by 10% of the source data or up to 70% of the source data based on the sample points in the source data and the tolerance settings. In another example, a low-fidelity version of the digital asset can include 33 percent of the sample points. Similarly, a medium-fidelity version is rendered with medium resolution and can include 66 percent of sample points. A high-fidelity version is rendered with high resolution can include 100 percent of sample points. It is understood that system can use various ranges of sample points to generate low, medium, and high-fidelity versions of the digital asset. The collaboration server can store the low-fidelity graphical data, the medium-fidelity graphical data and the high-fidelity graphical data in a database (operation 525). The different fidelity version can be generated based on demand at the time (e.g., based on the current zoom level of the client node) or multiple different fidelity versions can all be generated and then the desired fidelity can be provided to the client node.

The collaboration server includes logic to receive, from a second client node, a current zoom level of the second client node displaying a portion of the shared virtual workspace that includes a digital asset associated with the graphical data (operation 530).

The collaboration server can send at least one of the low-fidelity graphical data, the medium-fidelity graphical data and the high-fidelity graphical data to the second client node in dependence on the current zoom level of the second client node (operation 535). For example, the collaboration server can send low-fidelity graphical data representing a low fidelity version of the digital asset to a client node that has a viewport which is zoomed-out. The strokes become small on the viewport of this client node and hence low-fidelity rendering of the digital asset can be sufficient. The collaboration server can set threshold values for zoom levels at client nodes. For example, when the zoom level is above a first threshold, low-fidelity version of the digital asset can be sent to the client node. When the zoom level is above a first threshold but below a second threshold, medium-fidelity version of the digital asset can be sent. When the zoom level at the client node is above the second threshold, a high-fidelity version of the digital asset can be sent to the client node. A higher threshold value can indicate a zoomed-in viewport while a lower threshold value indicates a zoomed-out viewport. Therefore, the technology disclosed can efficiently send data to various client nodes by using their respective zoom levels to select appropriate version of the digital asset to send. This can save computing, networking, and memory resources for processing the digital assets at respective clients-side network nodes for rendering. Fewer sample points may be needed to draw a graphical shape on a destination client-node that is displaying the graphical shape in a low resolution or that is displaying the graphical shape in a zoomed-out viewport to the workspace. Therefore, fewer sample points can be used to render the graphical objects on the destination client-node in such circumstances. A sample point or a data point is a location on the workspace mapped to the display screen linked to the client node. The graphical data including sample points and other parameters (e.g., width, color, interpolation type, etc.) can be sent to the client node as update events to the spatial event map.

The technology disclosed provides efficient operation of collaboration sessions that include sharing of digital assets and interaction using annotation, drawings, notes, etc. The system can provide scalability by generating graphical data at multiple fidelity-levels of intermediate representations of digital assets. The technology disclosed reduces size of data that needs to be transmitted between client nodes and server node, thus increasing the efficiency and performance of the collaboration system. The intermediate representation is editable which makes it easier for client nodes to apply various rendering and edit operations on this data.

System Architecture

Figure 6:
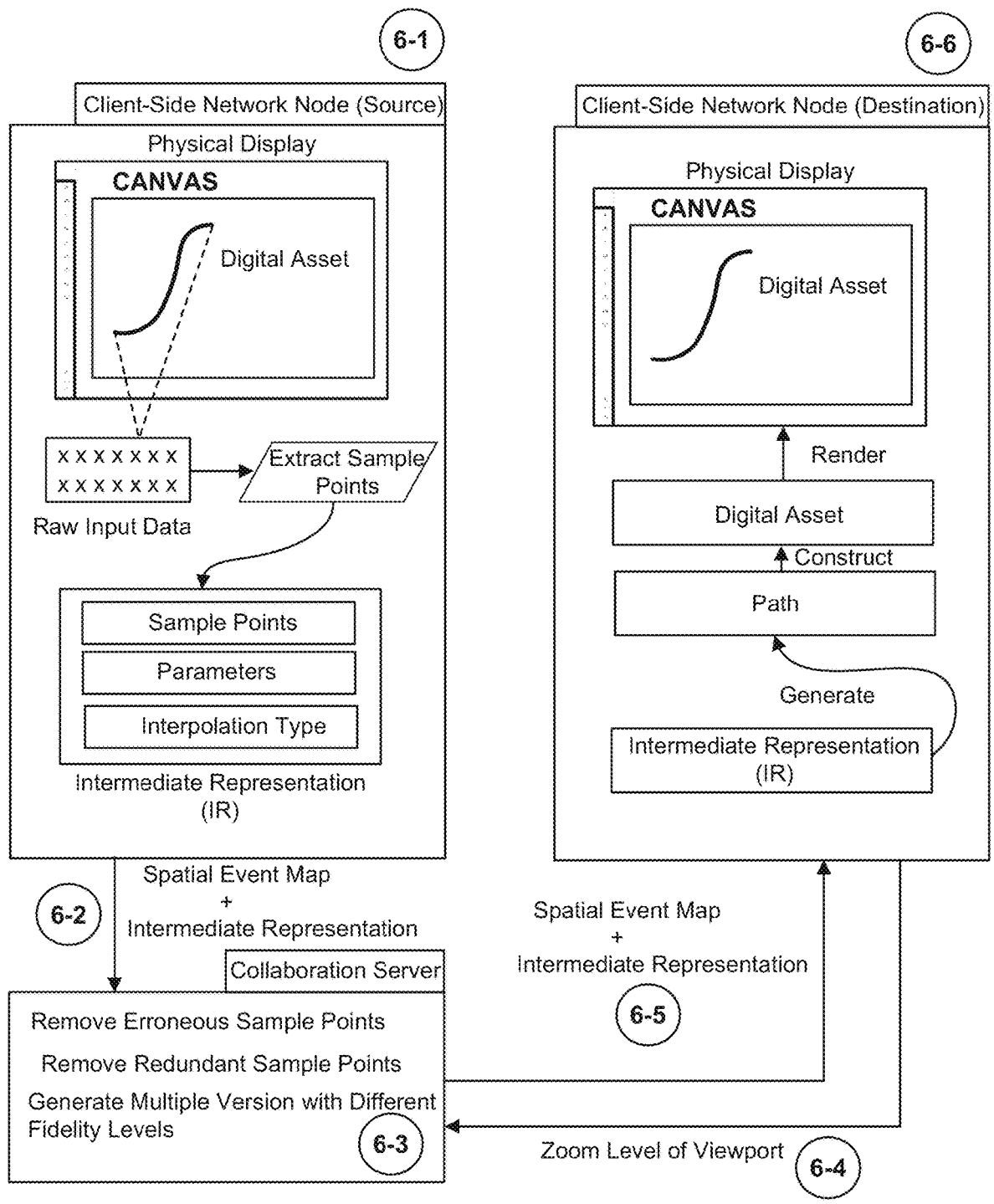
FIG. 6 presents a high-level architecture of the technology disclosed.

FIG. 6 presents a high-level architecture of the technology disclosed. Three main components of the system: a source (or a first) client node, a collaboration server and a destination (or a second) client node are shown in the illustration. At least a part of the data processing logic can be implemented within the data processing engine 110 as part of the collaboration server 205. Labels (or numerals) 6-1 through 6-6 indicate a high-level sequence of operations performed by the various system components.

A participant of the collaboration session draws a digital asset on a physical display (or a graphical display) linked to the source (or first) client node. The high-level operations performed by the source client node are presented in a box labeled as "6-1". The client node includes logic to extract sample points from the raw input data. The client node generates an intermediate representation of the digital asset which can include the sample points that define a path of the digital asset. The intermediate representation can include parameters that can include color, width, position, etc. of the digital asset. The intermediate representation can also include an interpolation type (or an interpolation method) that is used for rendering the digital asset.

The intermediate representation of the digital asset can be sent as part of the spatial event map to the collaboration server (operation 6-2).

The collaboration server can remove erroneous sample points and redundant sample points from the sample points received as part of the intermediate representation of the digital asset. The collaboration server can generate multiple versions of the intermediate representation of the digital asset with different fidelity-levels (or resolution levels). The high-level operations performed by the collaboration server are presented in a box labeled as "6-3".

The collaboration server receives a current zoom level of the viewport of graphical display linked to the destination (or second) client node (operation 6-4). Alternatively, the collaboration server can receive the zoom level first and then generate the graphical data at the corresponding level of fidelity.

The collaboration server sends the spatial event map including the intermediate representation or graphical data of the digital asset at a fidelity level matching the current zoom level of the viewport of the graphical display linked to the destination client node (operation 6-5). The intermediate representation of digital asset is sent as graphical data to a destination client node.

The destination client generates a path using sample points in the received graphical data. A path of the graphical shape is determined using the interpolation type received as part of the graphical data from the collaboration server. The client node applies the parameters (such as width, color, etc.) received as part of the graphical data to render the digital asset on the graphical display linked to the destination client node. The above-listed operations on the destination client node are presented in a box labeled as "6-6".

Computer System

Figure 7:
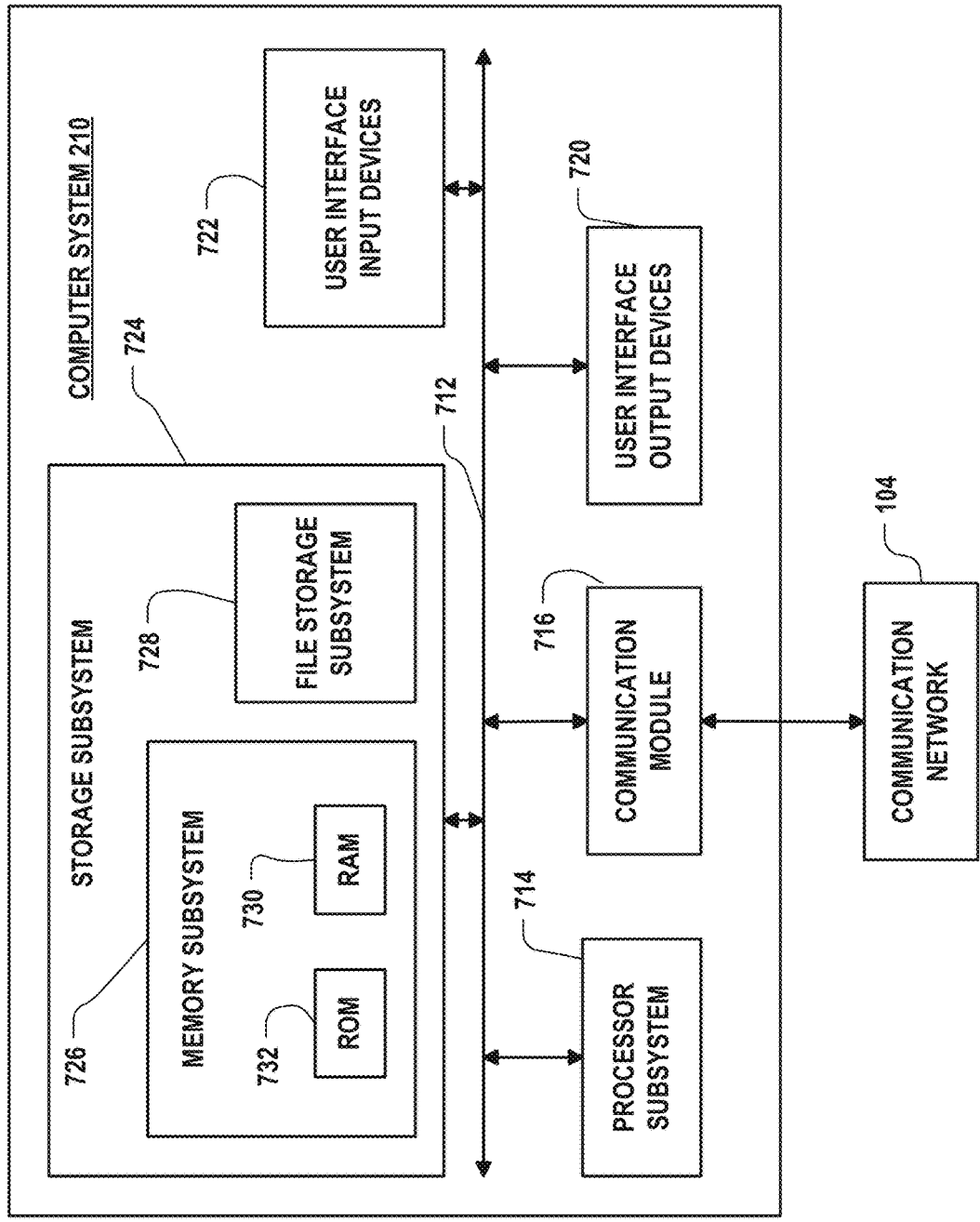
FIG. 7 presents a computer system that implements efficient transfer of data using intermediate representation of data.

FIG. 7 is a simplified block diagram of a computer system, or network node, which can be used to implement the client functions (e.g., computer system 210) or the server-side functions (e.g., server 205) for processing stroke data in a distributed collaboration system. A computer system typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a communication module 716. The input and output devices allow user interaction with the computer system.

Communication module 716 provides physical and communication protocol support for interfaces to outside networks, including an interface to communication network 204, and is coupled via communication network 204 to corresponding communication modules in other computer systems. Communication network 204 may comprise many interconnected computer systems and communication links. These communication links may be wireline links, optical links, wireless links, or any other mechanisms for communication of information, but typically it is an IP-based communication network, at least at its extremities. While in one embodiment, communication network 204 is the Internet, in other embodiments, communication network 204 may be any suitable computer network.

The physical hardware component of network interfaces is sometimes referred to as network interface cards (NICs), although they need not be in the form of cards: for instance, they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display (including the touch sensitive portions of large format digital display such as 102c), audio input devices such as voice recognition systems, microphones, and other types of tangible input devices. In general, use of the term "input device" is intended to include all possible types of devices and ways to input information into the computer system or onto computer network 104.

User interface output devices 720 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computer system to the user or to another machine or computer system.

Storage subsystem 724 stores the basic programming and data constructs that provide the functionality of certain embodiments of the present invention.

The storage subsystem 724 when used for implementation of server nodes, comprises a product including a non-transitory computer readable medium storing a machine-readable data structure including a spatial event map which locates events in a workspace, wherein the spatial event map includes a log of events, entries in the log having a location of a graphical target of the event in the workspace and a time. Also, the storage subsystem 724 comprises a product including executable instructions for performing the procedures described herein associated with the server node.

The storage subsystem 724 when used for implementation of client-nodes, comprises a product including a non-transitory computer readable medium storing a machine readable data structure including a spatial event map in the form of a cached copy as explained below, which locates events in a workspace, wherein the spatial event map includes a log of events, entries in the log having a location of a graphical target of the event in the workspace and a time. Also, the storage subsystem 724 comprises a product including executable instructions for performing the procedures described herein associated with the client node.

For example, the various modules implementing the functionality of certain embodiments of the invention may be stored in storage subsystem 724. These software modules are generally executed by processor subsystem 714.

Memory subsystem 726 typically includes a number of memories including a main random-access memory (RAM) 730 for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs and may be stored by file storage subsystem 728. The host memory 726 contains, among other things, computer instructions which, when executed by the processor subsystem 714, cause the computer system to operate or perform functions as described herein. As used herein, processes and software that are said to run in or on the "host" or the "computer," execute on the processor subsystem 714 in response to computer instructions and data in the host memory subsystem 726 including any other local or remote storage for such instructions and data.

Bus subsystem 712 provides a mechanism for letting the various components and subsystems of a computer system communicate with each other as intended. Although bus subsystem 712 is shown schematically as a single bus, alternative embodiments of the bus subsystem may use multiple busses.

The computer system 210 itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format display such as 102c. Due to the ever-changing nature of computers and networks, the description of computer system 210 depicted in FIG. 7 is intended only as a specific example for purposes of illustrating the preferred embodiments of the present invention. Many other configurations of the computer system are possible having more or less components than the computer system depicted in FIG. 7. The same components and variations can also make up each of the other devices 102 in the collaboration environment of FIG. 1, as well as the collaboration server 205 and database 206 as shown in FIG. 2.

Certain information about the drawing regions active on the digital display 102c are stored in a database accessible to the computer system 210 of the display client. The database can take on many forms in different embodiments, including but not limited to a MongoDB database, an XML database, a relational database, or an object-oriented database.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present technology may consist of any such feature or combination of features. In view of the foregoing description, it will be evident to a person skilled in the art that various modifications may be made within the scope of the technology.

The foregoing description of preferred embodiments of the present technology has been provided for the purposes of illustration and description. It is not intended to be exhaustive or to limit the technology to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the technology. In addition, any and all variations described, suggested or incorporated by reference herein with respect to any one embodiment are also to be considered taught with respect to all other embodiments. The embodiments described herein were chosen and described in order to best explain the principles of the technology and its practical application, thereby enabling others skilled in the art to understand the technology for various embodiments and with various modifications as are suited to the particular use contemplated. It is intended that the scope of the technology be defined by the following claims and their equivalents.

What is claimed is:

1. A method of processing data received at a server node from a first client node participating in a collaboration session using a shared virtual workspace, the method comprising:
   generating filtered data by removing one or more erroneous sample points from the data received from the first client node participating in the collaboration session, wherein the one or more erroneous sample points represent one or more sample points determined to be unintentionally entered at the first client node during the collaboration session;
   generating selected data by removing one or more redundant sample points from the filtered data, wherein a redundant sample point represents a sample point, of the filtered data, that can be regenerated from one or more adjacent sample points, of the filtered data, using interpolation;
   generating, from the selected data, graphical data at multiple fidelity levels including at least one of low-fidelity graphical data, medium-fidelity graphical data and high-fidelity graphical data;
   receiving, from a second client node, a current zoom level of the second client node displaying a portion of the shared virtual workspace that includes a digital asset associated with the graphical data; and
   sending at least one of the low-fidelity graphical data, the medium-fidelity graphical data and the high-fidelity graphical data to the second client node in dependence on the current zoom level of the second client node.

2. The method of claim 1, wherein the graphical data includes at least two of the low-fidelity graphical data, the medium-fidelity graphical data and the high-fidelity graphical data.

3. The method of claim 1, further including, sending the low fidelity graphical data to the second client node when the current zoom level of the second client node is within a low-resolution range wherein the low-resolution range is less than a first resolution threshold.

4. The method of claim 1, further including, sending the medium fidelity graphical data to the second client node when the current zoom level of the second client node is with a medium-resolution range wherein the medium-resolution range is greater than a first resolution threshold and less than a second resolution threshold.

5. The method of claim 1, further including, sending the high-fidelity graphical data to the second client node when the current zoom level of the second client node is with a high-resolution range wherein the high-resolution range is greater than a second resolution threshold.

6. The method of claim 1, wherein the data received by the server node from the first client node is an intermediate representation of the sample points corresponding to the sample points entered at the first client node wherein a size of the data corresponding to the intermediate representation of sample points is less than a size of the data corresponding to the sample points entered at the first client node.

7. The method of claim 1, wherein the data received by the server node includes stroke data corresponding to a shape or drawing generated from an input at the first client node.

8. The method of claim 7, wherein the stroke data includes a width of at least a portion of the shape or drawing.

9. The method of claim 7, wherein the stroke data includes a color of at least a portion of the shape or drawing.

10. The method of claim 7, wherein the stroke data includes a location of sample points corresponding to at least a portion of the shape or drawing.

11. The method of claim 1, wherein the data includes an interpolation type of a path represented by at least a portion of sample points included in the data.

12. The method of claim 11, wherein the interpolation type indicates a method to construct new data points within a range of sample points in the data to allow for displaying or rendering the graphical data.

13. The method of claim 1, wherein the sending of the generated graphical data to the second client node allows the second client node to:
   generate at least one of polygons and triangulation data by processing the sample points in the graphical data;
   process the at least one of the polygons and the triangulation data to generate a path;
   render the graphical data using the path and values of other parameters included in the graphical data, wherein the other parameters include at least two of a width parameter, a color parameter, and a location parameter; and display the rendered graphical data on a graphical display associated with the second client node.

14. A system including one or more processors coupled to memory, the memory loaded with computer instructions to process data received at a server node from a first client node participating in a collaboration session using a shared virtual workspace, the instructions, when executed on the one or more processors, implementing operations comprising:

generating filtered data by removing one or more erroneous sample points from the data received from the first client node participating in the collaboration session, wherein the one or more erroneous sample points represent one or more sample points determined to be unintentionally entered at the first client node during the collaboration session;

generating selected data by removing one or more redundant sample points from the filtered data, wherein a redundant sample point represents a sample point, of the filtered data, that can be regenerated from one or more adjacent sample points, of the filtered data, using interpolation;

generating, from the selected data, graphical data at multiple fidelity levels including at least one of low-fidelity graphical data, medium-fidelity graphical data and high-fidelity graphical data;

receiving, from a second client node, a current zoom level of the second client node displaying a portion of the shared virtual workspace that includes a digital asset associated with the graphical data; and sending at least one of the low-fidelity graphical data, the medium-fidelity graphical data and the high-fidelity graphical data to the second client node in dependence on the current zoom level of the second client node.

15. The system of claim 14, wherein the graphical data includes at only two of the low-fidelity graphical data, the medium-fidelity graphical data and the high-fidelity graphical data.

16. The system of claim 14, wherein the data received by the server includes stroke data corresponding to a shape or drawing generated from an input at the first client node.

17. The system of claim 16, wherein the stroke data includes a width of at least a portion of the shape or drawing.

18. The system of claim 16, wherein the stroke data further includes a color of at least a portion of the shape or drawing.

19. The system of claim 16, wherein the stroke data further includes a location of sample points corresponding to at least a portion of the shape or drawing.

20. A non-transitory computer readable storage medium impressed with computer program instructions to process data received at a server node from a first client node participating in a collaboration session using a shared virtual workspace, the instructions, when executed on one or more processors, causing the one or more processors to implement operations comprising:

generating filtered data by removing one or more erroneous sample points from the data received from the first client node participating in the collaboration session, wherein the one or more erroneous sample points represent one or more sample points determined to be unintentionally entered at the first client node during the collaboration session;

generating selected data by removing one or more redundant sample points from the filtered data, wherein a redundant sample point represents a sample point, of the filtered data, that can be regenerated from one or more adjacent sample points, of the filtered data, using interpolation;

generating, from the selected data, graphical data at multiple fidelity levels including at least one of low-fidelity graphical data, medium-fidelity graphical data and high-fidelity graphical data;

receiving, from a second client node, a current zoom level of the second client node displaying a portion of the shared virtual workspace that includes a digital asset associated with the graphical data; and sending at least one of the low-fidelity graphical data, the medium-fidelity graphical data and the high-fidelity graphical data to the second client node in dependence on the current zoom level of the second client node.

21. The non-transitory computer readable storage medium of claim 20, wherein the graphical data includes at least two of the low-fidelity graphical data, the medium-fidelity graphical data and the high-fidelity graphical data.

22. The non-transitory computer readable storage medium of claim 20, wherein the data received by the server includes stroke data corresponding to a shape or drawing generated from an input at the first client node.

23. The non-transitory computer readable storage medium of claim 22, wherein the stroke data includes a width of at least a portion of the shape or drawing.

24. The non-transitory computer readable storage medium of claim 20, wherein the sending of the generated graphical data to the second client node allows the second client node to:

generate polygons and triangulation data by processing the sample points in the graphical data;

process the polygons and the triangulation data to generate a path;

render the graphical data using the path and values of other parameters included in the graphical data wherein the other parameters include at least two of a width parameter, a color parameter, and a location parameter; and display the rendered graphical data on a graphical display linked to the second client node.

25. A method of a first client node receiving graphical data from a server node participating in a collaboration session using a shared virtual workspace, the method comprising:

providing, to the server, a current zoom level of the first client node displaying a portion of the shared virtual workspace that includes a digital asset associated with the graphical data;

receiving, from the server node, graphical data generated by:

generating filtered data by removing one or more erroneous sample points from data received from a second client node participating in the collaboration session, wherein the one or more erroneous sample points represent one or more sample points determined to be unintentionally entered at the first client node during the collaboration session;

generating selected data by removing one or more redundant sample points from the filtered data, wherein a redundant sample point represents a sample point, of the filtered data, that can be regenerated from one or more adjacent sample points, of the filtered data, using interpolation; and generating, from the selected data, the graphical data at multiple fidelity levels including at least one of low-fidelity graphical data, medium-fidelity graphical data and high-fidelity graphical data,
wherein the received graphical data includes at least one of the low-fidelity graphical data, the medium-fidelity graphical data and the high-fidelity graphical data selected in dependence on the current zoom level of the first client node.

26. The method of claim 25, wherein the data received at the server node from the second client node is an intermediate representation of the sample points corresponding to the sample points entered at the second client node wherein a size of the data corresponding to the intermediate representation of sample points is less than a size of the data corresponding to the sample points entered at the second client node.

27. The method of claim 25, wherein the data received at the server node from the second client node includes stroke data corresponding to a shape or drawing generated from an input at the first client node.

28. The method of claim 27, wherein the stroke data includes a width of at least a portion of the shape or drawing.

29. The method of claim 27, wherein the stroke data includes a color of at least a portion of the shape or drawing.

30. The method of claim 27, wherein the stroke data includes a location of sample points corresponding to at least a portion of the shape or drawing.

* * * * *